(12) United States Patent
Szul et al.

(10) Patent No.: US 6,399,722 B1
(45) Date of Patent: Jun. 4, 2002

(54) SOLUTION FEED OF MULTIPLE CATALYSTS

(75) Inventors: John F. Szul, Nitro; Kersten Anne Erickson, South Charleston; Simon Mawson, Charleston; David James Schreck, Cross Lanes; Mark G. Goode, Hurricane; Paul T. Daniell, Tornado; Matthew G. McKee; Clark C. Williams, both of Charleston, all of WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/451,792

(22) Filed: Dec. 1, 1999

(51) Int. Cl.$^7$ ................................................. C08F 4/42
(52) U.S. Cl. ....................... 526/113; 526/118; 526/943; 526/160; 526/348; 526/161; 502/152
(58) Field of Search .................. 526/348, 160, 526/943, 161, 113, 118; 502/152

(56) References Cited

U.S. PATENT DOCUMENTS

| 4,789,714 A | | 12/1988 | Cozewith et al. ............. 526/88 |
| 5,576,260 A | * | 11/1996 | Winter et al. ................ 502/117 |
| 5,852,143 A | * | 12/1998 | Sishta et al. ................. 526/127 |

FOREIGN PATENT DOCUMENTS

| DK | 2 332 890 | | 6/1972 |
| EP | 0 874 005 A1 | | 10/1998 |
| WO | WO 99/03899 | | 1/1933 |
| WO | WO 97/48735 | * | 12/1997 |
| WO | WO99/03899 | | 1/1999 |
| WO | WO 99/23124 | * | 5/1999 |

* cited by examiner

Primary Examiner—David W. Wu
Assistant Examiner—Ling-Siu Choi
(74) Attorney, Agent, or Firm—Jaimes Sher; Lisa Kimes Jones

(57) ABSTRACT

This invention relates to methods to introduce multiple catalysts, activators or catalyst systems into a gas phase reactor.

15 Claims, 6 Drawing Sheets

SOLUTION FEED OF MULTIPLE CATALYSTS

FIELD OF THE INVENTION

This invention relates to a method to feed multiple catalysts systems into a polymerization reactor, preferably a gas or slurry phase polymerization reactor.

BACKGROUND OF THE INVENTION

The demands of polyolefin fabricators are increasingly becoming more and more specific. In an attempt to meet these demands polyolefin producers are attempting to create more and more specialized polyolefins that have particular product configurations. One means to do this comprises using two catalysts in the same reactor to produce intimately mixed polymer blends. The difficulty however lies in selecting compatible catalysts that will actually work together well and reactor conditions that do not benefit one catalyst while hindering another.

Mobil, in PCT patent application WO 99/03899, discloses using a metallocene type catalyst and a Ziegler-Natta type catalyst in the same reactor to produce a bimodal molecular weight distribution (MWD) high-density polyethylene (HDPE). These two catalyst however were fed into the reactor as supported powders.

U.S. Pat. Ser. No. 09/312,878 filed May 17, 1999 discloses a gas or slurry phase polymerization process using a supported bisamide catalyst.

SUMMARY OF THE INVENTION

This invention relates to a method to feed multiple catalysts systems into a polymerization reactor, preferably a gas or slurry phase polymerization reactor. The catalysts, activators and/or catalyst systems are preferably introduced into the reactor in a liquid carrier, preferably in solution. The catalysts, activators, catalysts systems, etc may be combined in different orders and in different amounts. The individual catalysts or activators may be introduced into the reactor directly or they may be combined with one or more other catalysts and or activators prior to being placed in the reactor. Further the catalysts, activators and/or catalyst systems (and the carriers) may be contacted sequentially, in series or in parallel. Each catalyst, however, is independently activated.

DETAILED DESCRIPTION OF THE INVENTION

Figure 1:
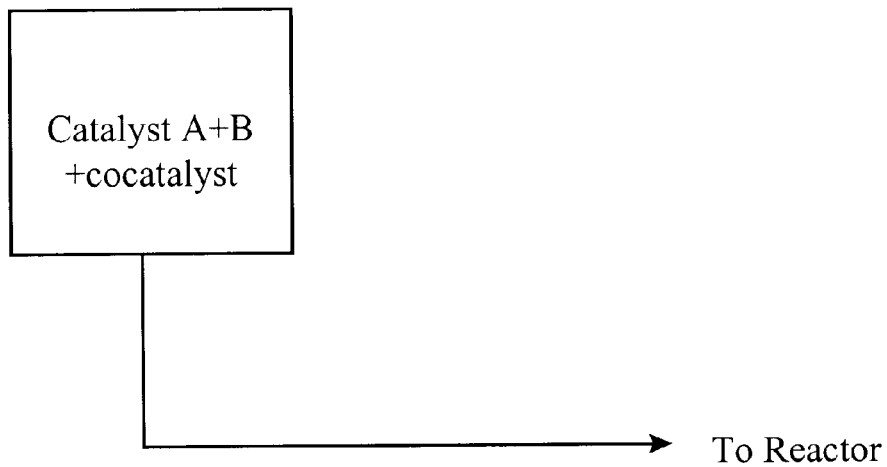
FIG. 1 is a graphic representation of Illustration 1 below.

In a preferred embodiment this invention relates to a method to introduce multiple catalysts, activators, or catalyst systems into a polymerization reactor, preferably a gas phase reactor. For the purposes of this invention the term "catalyst" refers to a metal compound that when combined with an activator polymerizes olefins. For the purposes of this invention, the term "catalyst system" refers to the combination of a catalyst and an activator. For the purposes of this invention the term "activator" is used interchangeably with the term "co-catalyst."

The catalyst system(s), the catalysts and or the activators are preferably introduced into the reactor in one or more liquid carriers, preferably as a solution, suspension or an emulsion. For example, in one embodiment, a solution of two catalyst systems in an alkane such as pentane, hexane, toluene, isopentane or the like is introduced into the gas or slurry phase reactor. In another embodiment the catalyst or activator or both are contacted in a liquid carrier with a surfactant to produced an emulsion, then the emulsion is introduced into a reactor, such as for example, by spraying the emulsion into a particle lean zone. (Particle lean zones are described in U.S. Pat. No. 5,693,727, incorporated by reference herein.)

The catalysts, activators, catalysts systems, etc may be combined in different orders and in different amounts. In some embodiments the each catalyst may be contacted with the same or different activators. Likewise the catalysts may be contacted with each other first then contacted with the activator(s). Similarly the activator may be contacted with one catalyst first with the second catalyst being added thereafter. Further there may be time periods, anywhere from 1 second to several days or more between each of the contacts.

In the various activation and feed schemes possible in the practice of this invention it is particularly preferred that each catalyst be independently activated. By independently activated is meant that each catalyst has an opportunity to combine or react with an activator with having to compete for activator with another catalyst. For example in one embodiment the two catalysts are activated in separate chambers then combined before introduction into the reactor. In another embodiment a first catalyst is activated with an activator, thereafter a second catalyst is added to the first catalysts/activator combination and allowed to react/combine with the excess activator. In this embodiment the second catalyst is still activated independently from the first. Likewise in another embodiment two or more catalysts can be activated independently at the same time in the same solution as long as sufficient activator for both catalysts to be activated.

In another particularly preferred embodiment, the various catalyst combinations are all combined prior to being introduced into the reactor. The catalyst combinations may be fed into the reactor from multiple injection points, however it is preferred that the same catalyst solution be fed into the reactor through all the injection points.

Figure 2:
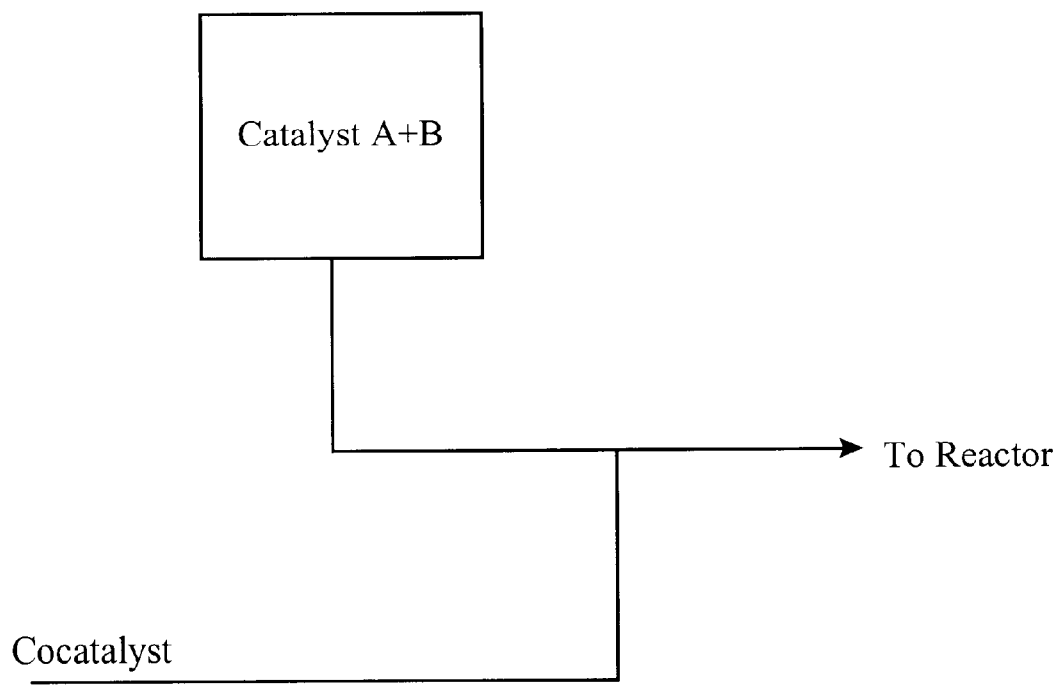
FIG. 2 is a graphic representation of Illustration 2 below.
Figure 3:
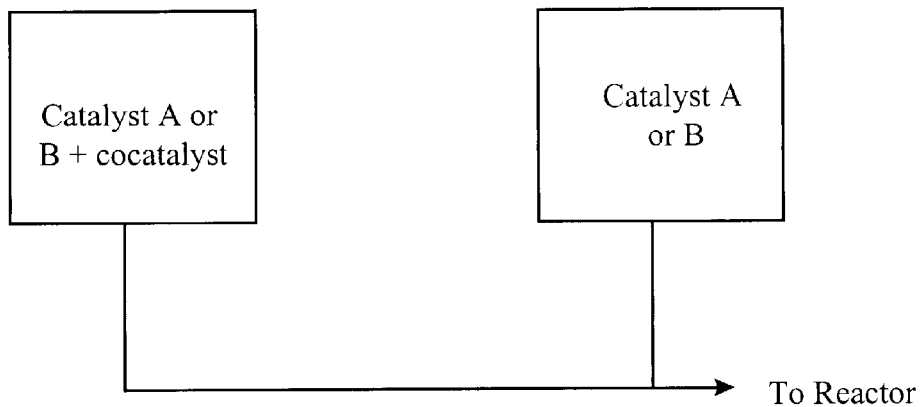
FIG. 3 is a graphic representation of Illustration 3 below.
Figure 4:
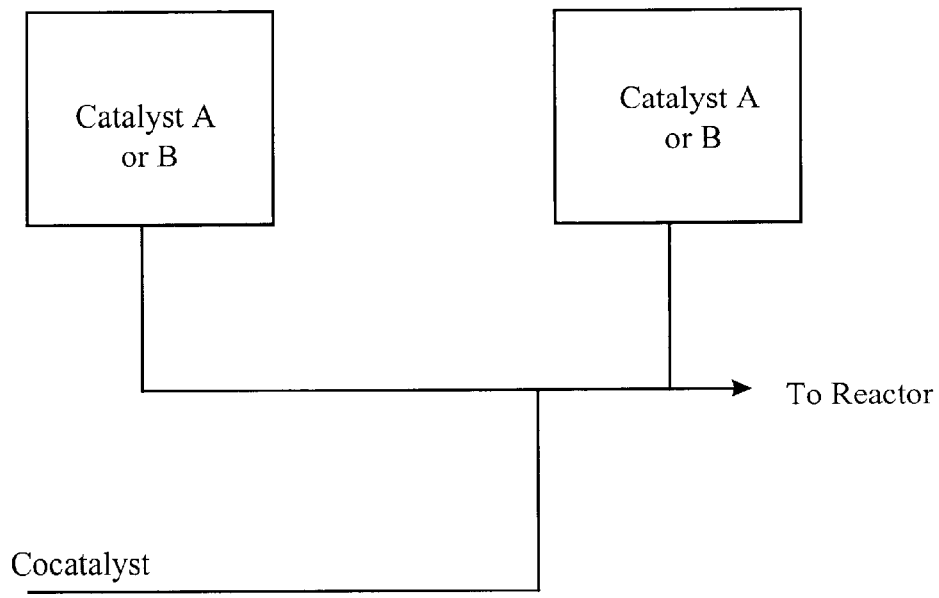
FIG. 4 is a graphic representation of Illustration 4 below.
Figure 5:
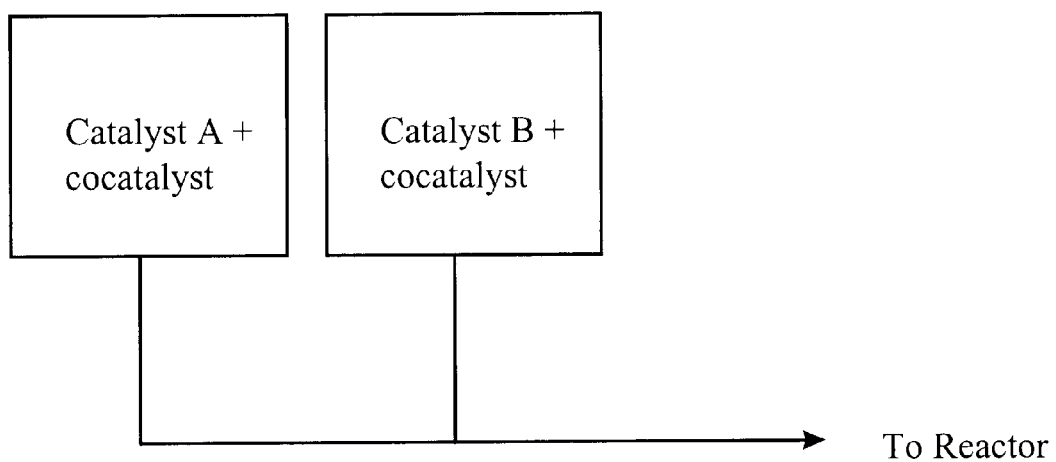
FIG. 5 is a graphic representation of Illustration 5 below.
Figure 6:
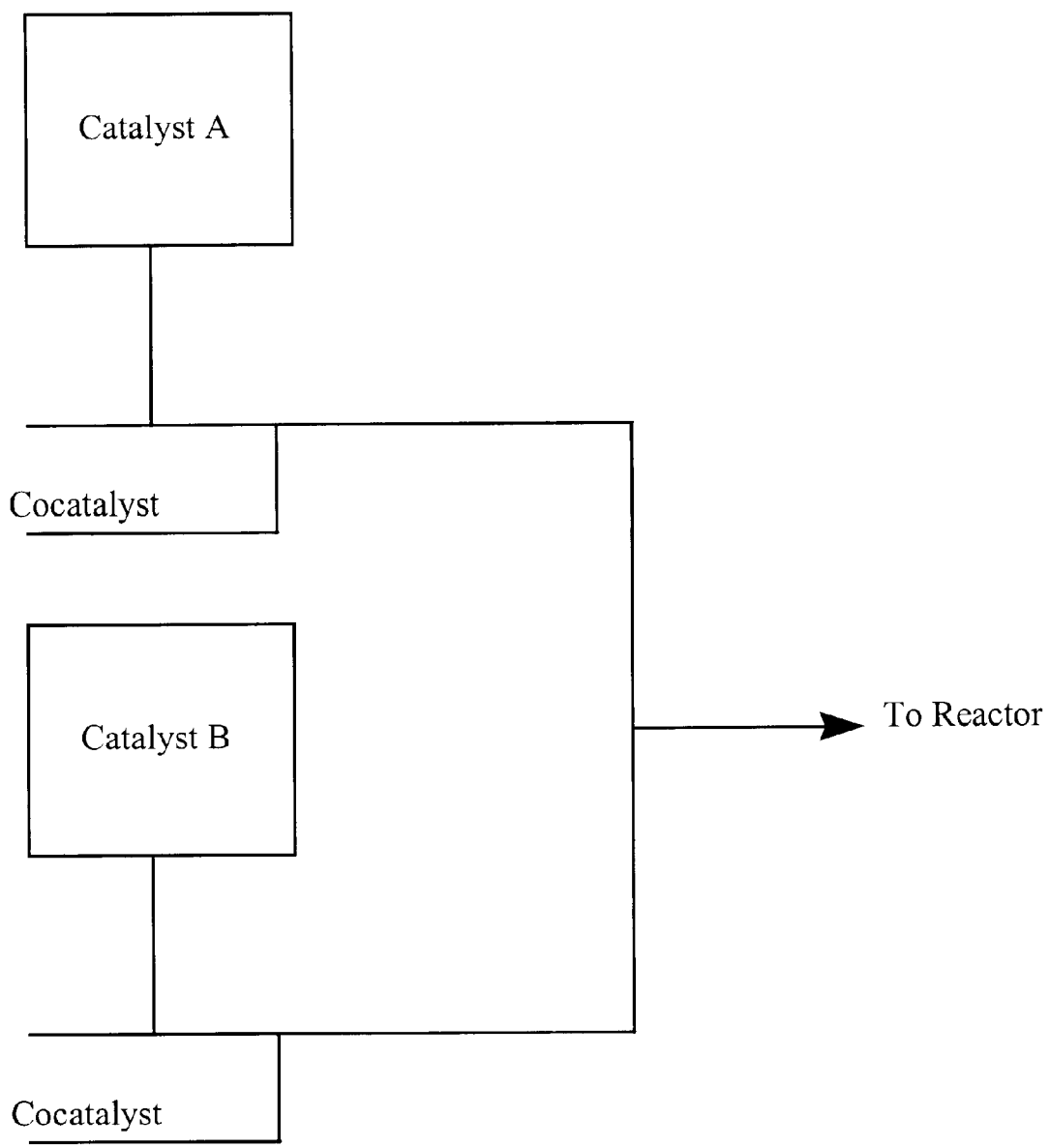
FIG. 6 is a graphic representation of Illustration 6 below.
Figure 7:
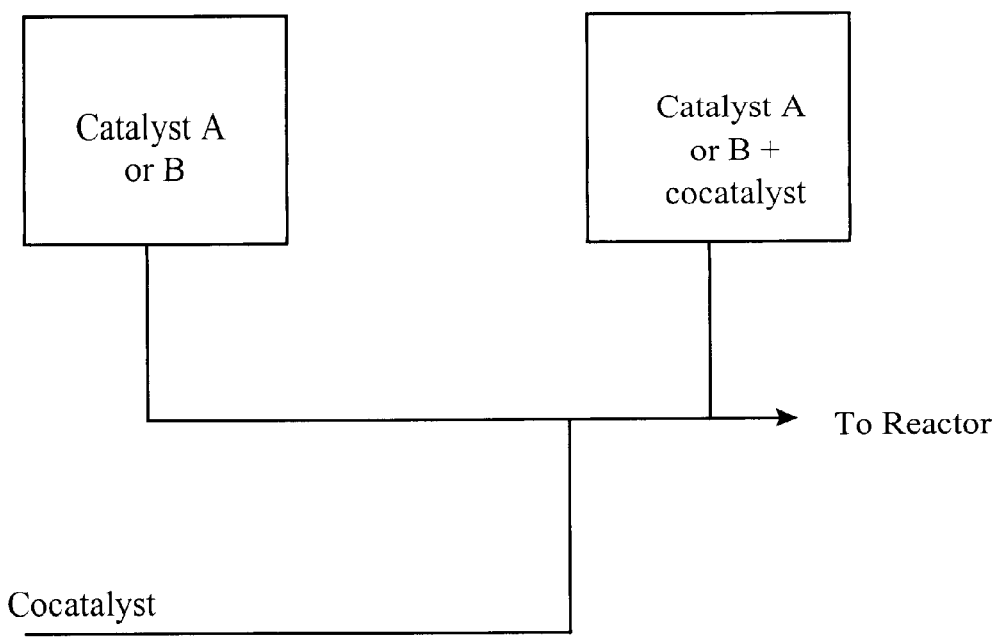
FIG. 7 is a graphic representation of Illustration 7 below.
Figure 8:
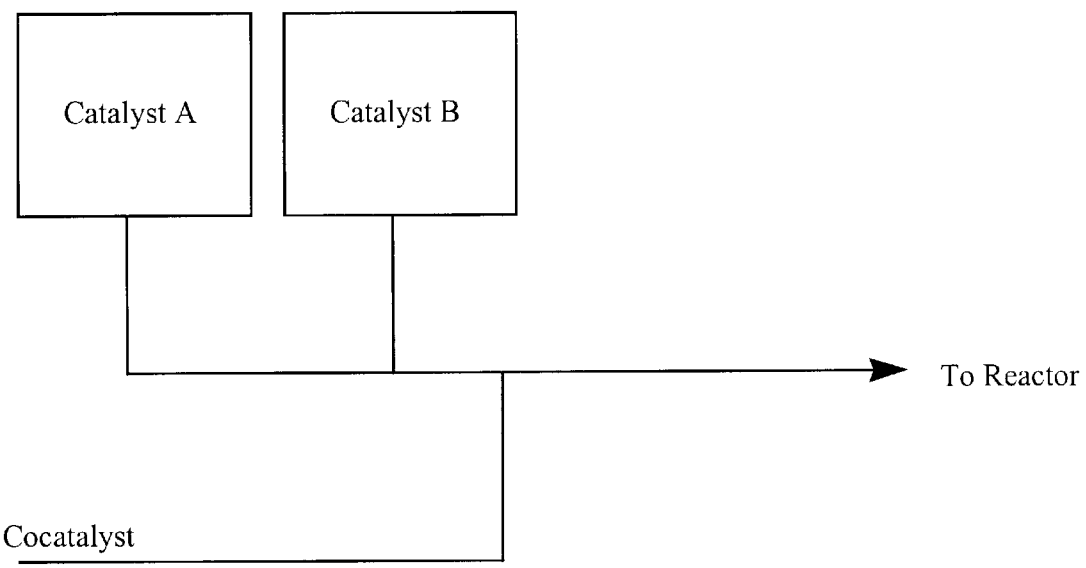
FIG. 8 is a graphic representation of Illustration 8 below.
Figure 9:
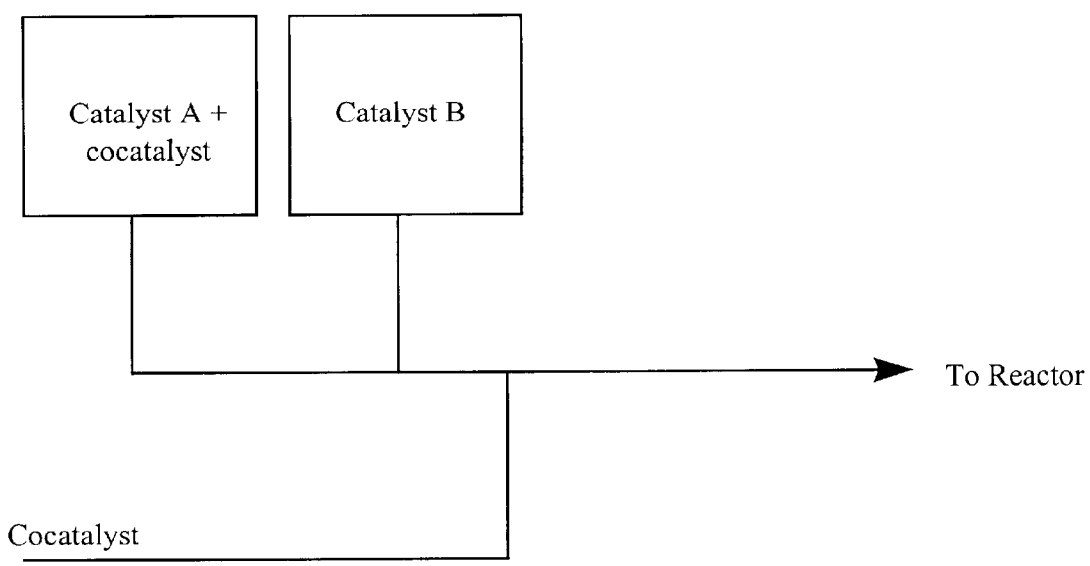
FIG. 9 is a graphic representation of Illustration 9 below.

In particular this invention relates to the following illustrations of combinations. In the following illustrations, A refers to a catalyst or mixture of catalysts, and B refers to a different catalyst or mixture of catalysts. The mixtures of catalysts in A and B can be the same catalysts, just in different ratios. Graphic representations of theses illustrations are FIGS. 1–9. Further, it is noted that additional solvents or inert gases may be added at many locations.

Illustration 1: A and B plus the activator are mixed off-line and then fed to the reactor.

Illustration 2: A and B are mixed off-line. Activator is added on-line and then fed to the reactor.

Illustration 3: A or B is contacted with the activator (off-line) and then either A or B is added on-line before entering the reactor.

Illustration 4: A or B is contacted with the activator (on-line) and then either A or B is added on-line before entering the reactor.

Illustration 5: A and B are each contacted with the activator off-line. Then A+activator and +cocatalyst are contacted on-line before entering the reactor.

Illustration 6: A and B are each contacted with the activator on-line. Then A+activator and B+activator are contacted on-line before entering the reactor. (This is a preferred configuration since the ratio of A to B and the ratio of activator to A and the ratio of activator to B can be controlled independently.)

Illustration 7: In this example, A or B is contacted with the activator (on-line) while a separate solution of either A or B is contacted with activator off-line. Then both stream of A or B+activator are contacted on-line before entering the reactor.

Illustration 8: A is contacted on-line with B. Then, an activator is fed to on-line to the A+B mixture.

Illustration 9: A is activated with activator off-line. Then A+activator is contacted on-line with B. Then, an activator is fed to in-line to the A+B+activator mixture.

Illustration 10: A and B are mixed off-line. Then the mixture of A and B is contacted on-line with activator, then additional catalyst A is added on line, thereafter additional catlayst B is added on-line and then the whole mixture is introduced into the reactor.

In any of the above illustrations, a means for mixing and/or creating a certain residence time may be employed. For example a mixing blade or screw may be used to mix the components or a certain length pipe may be used to obtain a desired contact or residence time between the components.

"On-line" means the material described is in a pipe, tube, or vessel which is directly or indirectly connected to the reactor system.

"Off-line" means the material described is in a pipe, tube, or vessel which is not connected to the reactor system.

In a preferred embodiment this invention relates to a method to polymerize olefins in a gas-phase reactor wherein at least two catalysts and at least one activator are introduced in the polymerization reactor in a liquid carrier. In a preferred embodiment the catalysts and the activator(s) are combined in the liquid carrier before being introduced into the reactor.

In another preferred embodiment the catalysts are combined in a liquid carrier then introduced into a channeling means connecting to the reactor and thereafter the activator (s) is introduced into the channeling means at the same or different point as the catalysts.

In another preferred embodiment the catalysts are combined in a liquid carrier and thereafter the activator(s) is introduced into the liquid carrier.

In another preferred embodiment the liquid carrier containing the catalysts and the activator(s) are placed into an apparatus for introducing the liquid carrier into the reactor.

In another preferred embodiment the catalysts and liquid carrier are introduced into the apparatus before the activator is introduced into the apparatus.

In another preferred embodiment the composition comprising the liquid carrier comprises a liquid stream flowing or sprayed into the reactor.

In another preferred embodiment at least one catalyst, at least one activator and the liquid carrier are placed into an apparatus for introduction into the reactor wherein additional catalyst(s) is/are introduced into the apparatus after the first catalyst and activator are introduced into the apparatus.

In another preferred embodiment, a first combination comprising at least one catalyst in a liquid carrier is introduced into an apparatus connecting to the reactor, and a second composition comprising at least one activator in liquid carrier is introduced into the apparatus connecting to the reactor, then, after a period of time, a different catalyst in liquid carrier is introduced into the apparatus connecting to the reactor, and then the catalyst-activator combination is introduced into the reactor.

In another preferred embodiment, at least one catalyst(a) and at least one activator(a) are combined in a liquid carrier, and at least one catalyst(b) and at least one activator(b) are combined in a liquid carrier, wherein either the catalyst(b) is different from the catalyst(a) or the activator (b) is different from the activator(a), thereafter both combinations are introduced into an apparatus connecting to the reactor, and, thereafter the combinations are introduced into the reactor.

In another preferred embodiment the liquid carrier containing catalyst(b) and activator(b) is introduced into the apparatus connecting to the reactor after the liquid carrier containing catalyst(a) and activator(a) is introduced into the apparatus connecting to the reactor.

In another preferred embodiment, a first composition comprising at least one catalyst(a), at least one activator(a) and a liquid carrier is placed in an apparatus connected to the reactor, and a second composition comprising at least one catalyst(b), at least one activator(b) and a liquid carrier, wherein either the catalyst(b) or the activator (b) is different from the catalyst(a) or the activator(a), is introduced into the apparatus connecting to the reactor after the first composition is, and thereafter the combined compositions is introduced into the reactor.

In another preferred embodiment at least one catalyst and the liquid carrier are placed into an apparatus for introduction into the reactor wherein additional catalyst(s) and activator(s) are introduced into the apparatus after the first catalyst is introduced into the apparatus.

In another preferred embodiment a first composition comprising at least one catalyst(a), at least one activator(a) and a liquid carrier is introduced into an apparatus feeding into a reactor, and thereafter a second catalyst in a liquid carrier is added to the apparatus feeding into the reactor, and thereafter a second activator in a liquid carrier is added to the apparatus feeding into the reactor, and thereafter the total combination is introduced into the reactor.

More specific preferred embodiments include:

1. Catalyst A could be used as a 0.25 weight % solution in hexane and Catalyst B could be used as a 0.50 weight % solution in toluene at molar ratios of B to A of about 0.7 when the two are activated separately then mixed together or at molar ratios of B to A of 2.2 to 1.5 when A is activated then B is added.

2. Raising or lowering the reaction temperature to narrow or broaden the Mw/Mn, respectively.

3. Changing residence time to affect product properties. Large changes can have significant impact. One to five, preferably four hours residence time appears to produce good product properties.

4. Spraying the catalyst into the reactor in such a way as to create a particle lean zone. A particle lean zone can be created by a 50,000 lb/hr flow of cycle gas through 6 inch pipe. The catalyst can be atomized w/ a spray nozzle using nitrogen atomizing gas.

5. The activator, preferably MMAO 3A can be used at 7 weight % al in isopentane, hexane or heptane at feed rate sufficient to give an Al/Zr ratio of 100 to 300.

6. Catalyst A is mixed on-line with MMAO 3A then Catalyst B is added on line, then the mixture is introduced into the reactor.

7. Catalyst A is mixed on-line with MMAO 3A and Catalyst B is mixed on line with MMAO 3A thereafter the two activated catalysts are mixed on-line then introduced into the reactor.

In a preferred embodiment Catalyst A is Compound I (as described below) and Catalyst B is indenyl zirconium tris pivalate.

In one embodiment, a second catalyst is contacted with the first catalyst and activator, such as modified methylalumoxane, in a solvent and just before the solution is fed into a gas or slurry phase reactor. In another embodiment a solution of a first catalyst is combined with a solution of the second catalyst and the activator then introduced into the reactor.

In another embodiment, two or more catalysts are blended together in a slurry feed vessel then are contacted with one or more activators, allowed to react for a specified amount of time then introduced into the reactor. In another embodiment two or more catalysts are contacted in-line and then the activator is fed into the combined stream then introduced into the reactor. In another embodiment the catalysts are independently activated in-line and then contacted just before delivery to the reactor. Intimate mixing of the catalysts and/or the activator is preferred. A static mixer can be used to achieve intimate mixing. In another embodiment the a dilute solution of catalyst is added to a pre-mixed batch of catalysts.

Solutions of the catalysts are prepared by taking the catalyst and dissolving it in any solvent such as a hydrocarbon, preferably an alkane, toluene, xylene, etc. The solvent may first be purified in order to remove any poisons which may affect the catalyst activity, including any trace water and/or oxygenated compounds. Purification of the solvent may be accomplished by using activated alumina and/or activated supported copper catalyst, for example. The catalyst is preferably completely dissolved into the solution to form a homogeneous solution. Both catalysts may be dissolved into the same solvent, if desired. Once the catalysts are in solution, they may be stored indefinitely until use. Preferred solvents include pentane, hexane, butane, isopentane, cyclohexane, toluene, xylene, and the like.

Catalysts

One of many catalysts or catalysts systems that may be used herein include a group 15 containing metal compound as described below. Other catalysts that may be used include transition metal catalysts not included in the description above such as one or more bulky ligand metallocene-type catalysts and/or one or more conventional type transition metal catalysts such as one or more Ziegler-Natta catalysts, vanadium catalysts and/or chromium catalysts.

For purposes of this invention cyclopentadienyl group is defined to include indenyls and fluorenyls.

Group 15 Containing Metal Compound

The mixed catalyst composition of the present invention includes a Group 15 containing metal compound. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In a preferred embodiment, the Group 15 containing metal compound of the present invention may be represented by the formulae:

Formula I

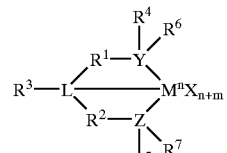

or

Formula II

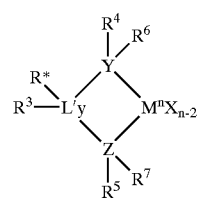

wherein M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl. y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$, to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

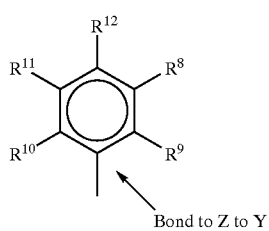

Formula 1 wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

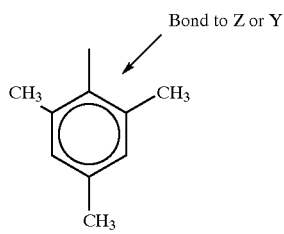

Formual 2

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In a particularly preferred embodiment the Group 15 containing metal compound is represented by the formula:

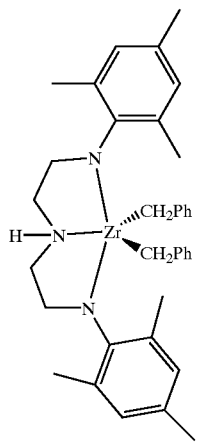

Compound I

In compound I, Ph equals phenyl.

The Group 15 containing metal compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

A preferred direct synthesis of these compounds comprises reacting the neutral ligand, (see for example YZL or YZL' of formula 1 or 2) with $M''X_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL' of formula 1 or 2) with a compound represented by the formula $M''X_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

Bulky Ligand Metallocene-Type Compound

Bulky ligand metallocene-type compound (hereinafer also referred to as metallocenes) may also be used in the practice of this invention.

Generally, bulky ligand metallocene-type compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably η$^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds are represented by the formula:

$$L^A L^B MQ_n \qquad (III)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably η$^3$-bonding to M and most preferably η$^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (III) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkylcarbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that formula (III) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

The two L groups may be bridged together by group A as defined below.

In one embodiment, the bulky ligand metallocene-type catalyst compounds of the invention include those of formula (III) where $L^A$ and $L^B$ are bridged to each other by at least one bridging group, A, such that the formula is represented by $$L^A L^B MQ_n \qquad (IV)$$

These bridged compounds represented by formula (IV) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of formula (IV) have two or more bridging groups A (EP 664 301 B1).

In one embodiment, the bulky ligand metallocene-type catalyst compounds are those where the R substituents on the bulky ligands $L^A$ and $L^B$ of formulas (III) and (IV) are substituted with the same or different number of substituents on each of the bulky ligands. In another embodiment, the bulky ligands $L^A$ and $L^B$ of formulas (III) and (IV) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,543, 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

$$L^C AJMQ_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (V) above, $L^C$, A and J form a fused ring system. In an embodiment, $L^C$ of formula (V) is as defined above for $L^A$, A, M and Q of formula (V) are as defined above in formula (III).

In formula (V), J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233, 049, 5,744,417, and 5,856,258 all of which are herein incorporated by reference.

In one embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene-type catalyst compounds are those described in PCT publications WO 99/01481 and WO 98/42664, which are fully incorporated herein by reference.

In a preferred embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In a particularly preferred embodiment, the other metal compound or second metal compound is the bulky ligand metallocene-type catalyst compound is represented by the formula:

$$L^D MQ_2(YZ)X_n \qquad (VI)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; A or Q is a univalent anionic ligand also bonded to M; X is a univalent anionic group when n is 2 or X is a divalent anionic group when n is 1; n is 1 or 2.

In formula (VI), L and M are as defined above for formula (III). Q is as defined above for formula (III), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In a particularly preferred embodiment the bulky ligand metallocene-type compound is represented by the formula:

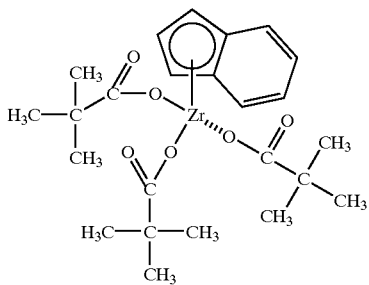

Phenoxide Catalysts

Another group of catalysts that may be used in the process of this invention include one or more catalysts represented by the following formulae:

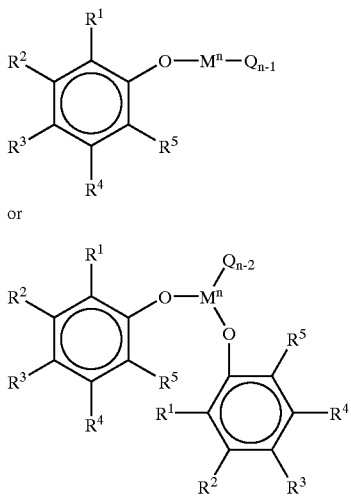

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl ) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$ A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

These phenoxide catalysts may be activated with activators including alkyl aluminum compounds (such as diethylaluminum chloride), alumoxanes, modified alumoxanes, non-coordinating anions, non-coordinating group 13 metal or metalliod anions, boranes, borates and the like. For further information on activators please see the ACTIVATOR section below.

Conventional-Type Transition Metal Catalysts

Conventional-type transition metal catalysts are those traditional Ziegler-Natta, vanadium and Phillips-type catalysts well known in the art. Such as, for example Ziegler-Natta catalysts as described in Ziegler-Natta Catalysts and Polymerizations, John Boor, Academic Press, New York, 1979. Examples of conventional-type transition metal catalysts are also discussed in U.S. Pat. Nos. 4,115,639, 4,077, 904, 4,482,687, 4,564,605, 4,721,763, 4,879,359 and 4,960, 741 all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The MgTiCl$_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as VCl$_3$, VOCl$_2$(OBu) where Bu=butyl and VO(OC$_2$H$_5$)$_3$; vanadium tetra-halide and vanadium alkoxy halides such as VCl$_4$ and VCl$_3$(OBu); vanadium and vanadyl acetyl acetonates and chloroacetyl acetonates such as V(AcAc)$_3$ and VOCl$_2$(AcAc) where (AcAc) is an acetyl acetonate. The preferred conventional-type vanadium catalyst compounds are VOCl$_3$, VCl$_4$ and VOCl$_2$—OR where R is a hydrocarbon radical, preferably a C$_1$ to C$_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include CrO$_3$, chromocene, silyl chromate, chromyl chloride (CrO$_2$Cl$_2$), chromium-2-ethyl-hexanoate, chromium acetylacetonate (Cr(AcAc)$_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as AlCl$_3$, and other cobalt, iron, nickel and palladium catalysts well known in the art. See for example U.S. Pat. Nos. 3,487,112, 4,472,559, 4,182,814 and 4,689,437 all of which are incorporated herein by reference.

Typically, these conventional-type transition metal catalyst compounds excluding some conventional-type chromium catalyst compounds are activated with one or more of the conventional-type cocatalysts described below.

Conventional-Type Cocatalysts

Conventional-type cocatalyst compounds for the above conventional-type transition metal catalyst compounds may be represented by the formula M$^3$M$^4{}_v$X$^2{}_c$R$^3{}_{b-e}$, wherein M$^3$ is a metal from Group 1 to 3 and 12 to 13 of the Periodic Table of Elements; M$^4$ is a metal of Group 1 of the Periodic Table of Elements; v is a number from 0 to 1; each X$^2$ is any halogen; c is a number from 0 to 3; each R$^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula M$^3$R$^3{}_k$, where M$^3$ is a Group IA, II, IIB or IIIA metal, such as lithium, sodium, beryllium, barium, boron, aluminum, zinc, cadmium, and gallium; k equals 1, 2 or 3 depending upon the valency of M$^3$ which valency in turn normally depends upon the particular Group to which M$^3$ belongs; and each R$^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromoaluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Activators

The catalysts, preferably the group 15 metal compound and/or the metallocene cataysts described herein, are preferably combined with one or more activators to form olefin polymerization catalyst systems. Preferred activators include alkyl aluminum compounds (such as diethylaluminum chloride), alumoxanes, modified alumoxanes, non-coordinating anions, non-coordinating group 13 metal or metalliod anions, boranes, borates and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Other useful compounds include triphenyl boron, triethyl boron, tri-n-butyl ammonium tetraethylborate, triaryl borane and the like. Other useful compounds include aluminate salts as well.

In a preferred embodiment modified alumoxanes are combined with the catalysts to form a catalyst system. In a preferred embodiment MMAO3A (modified methyl alumoxane in heptane, commercially available from Akzo Chemicals, Inc. under the trade name Modified Methylalumoxane type 3A, covered under patent number U.S. Pat. No. 5,041,584) is combined with the first and second metal compounds to form a catalyst system.

There are a variety of methods for preparing alumoxane and modified alumoxanes, non-limiting examples of which are described in U.S. Pat. No. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,041,584 5,693,838, 5,731,253, 5,041,584 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299, 5,502,124 and 5,643,847, all of which are herein fully incorporated by reference. Other activators include those described in PCT publication WO 98/07515 such as tris (2,2',2"-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

When two different catalysts are used, the first and second catalyst compounds may be combined at molar ratios of 1:1000 to 1000:1, preferably 1:99 to 99:1, preferably 10:90 to 90:10, more preferably 20:80 to 80:20, more preferably 30:70 to 70:30, more preferably 40:60 to 60:40. The particular ratio chosen will depend on the end product desired and/or the method of activation. One practical method to determine which ratio is best to obtain the desired polymer is to start with a 1:1 ratio, measure the desired property in the product produced and adjust the ratio accordingly.

In one particular embodiment, when using Compound I and indenyl zirconium tris-pivalate where both are activated with the same activator, the preferred weight percents, based upon the weight of the two catalysts, but not the activator or any support, are 10 to 95 weight % Compound I and 5 to 90 weight % indenyl zirconium tris-pivalate, preferably 50 to 90 weight % Compound I and 40 to 50 weight % indenyl zirconium tris-pivalate, more preferably 60–80 weight % Compound I to 40 to 20 weight % indenyl zirconium tris-pivalate. In a particularly preferred embodiment the indenyl zirconium tris-pivalate is activated with methylalumoxane, then combined with Compound I, then injected in the reactor.

Multi-component catalyst systems with similar activity decay rates provide a route for olefin polymerization in which the effects of catalyst residence time in the reactor can be mitigated. The catalysts preferably have a decay rate that is similar as measured by a decay model, be it first or higher order. The decay rates or alternatively, the catalyst half lives, are preferably within about 40% of each other, more preferably about 20% of each other, and most preferably about 10 to 0% of each other. 0% would mean essentially the same.

It is recognized that the decay characteristics can be affected by temperature, monomer pressure, comonomer type and concentration, hydrogen, additives/modifiers/other catalysts, catalyst poisons or impurities in the gas stream, presence of condensing agents or operation in condensing-mode.

A corollary to this is that one or both of the catalysts can have a fast decay such that they are relatively insensitive to residence time effects in the normal range of reactor operation. One can calculate how much the decay rates can differ between catalysts based upon their respective decay rates, in order that the variation of polymer properties in the reactor is relatively small when there are changes in residence time.

In another embodiment the first catalyst is selected because when used alone it produces a high weight average molecular weight polymer (such as for example above 100,000, preferably above 150,000, preferably above 200,000, preferably above 250,000, more preferably above 300,000) and the second catalyst is selected because when used alone it produces a low molecular weight polymer (such as for example below 80,000, preferably below 70,000, preferably below 60,000, more preferably below 50,000, more preferably below 40,000, more preferably below 30,000, more preferably below 20,000 and above 5,000, more preferably below 20,000 and above 10,000).

When two or more catalysts are used, multi-component catalyst polymerization split can be estimated and controlled by perturbing the feed rate of one or both of the catalyst feed rates to the polymerization reactor and measuring the change in polymer production rate. The invention is especially useful when the catalysts are indistinguishable elementally but can be used with other systems. It is especially applicable in systems where the relative amounts of each catalyst can be easily varied such as for solution feed or hybrid solution feed.

The change in catalyst feed is less than 40%, preferably less than 15% and most preferably about 5 to 10%. There are accompanying changes in the polymer split composition, however, these are relatively small and may be inconsequential as the timeframe for observing changes in production rate may be short relative to residence time in the reactor. The change in polymer composition is diluted.

The production rate need not line out, but can be estimated mathematically when it is about 30 to 80% of its final value based upon theoretical response of CSTR (continuous stirred tank reactor) to a step change.

The simplest case is for a catalyst with very fast decay so residence time effects are inconsequential (although decay can easily be dealt with using a simple formula). As an example, let catalyst A and B be fed at a 50:50 rate, producing 10,000 pph of resin. Increase catalyst A by 10% and hold B constant so the feed split is now 55:50. The production rate increases from 10,000 to 10,500 pph. The difference of 5000 pph is attributable to the 10% increase of catalyst A, so the initial amount of resin produce by A was 5000 pph and its new value is 5500 pph. The initial polymer split was 50:50 and the new split is 55:50. (In this example, the catalysts were taken to be equally active, but the equations work for other systems.)

The catalyst feed rate of one or both catalysts can be constantly perturbed by small amounts continuously around the aim split (back and forth) so that the net resin composition is always aim. A step change is made and the response measured. The system performance can include an update term based on measured split to account for variations in catalyst productivity and decay.

Catalyst productivity models including the effects of temperature, residence time, monomer partial pressure, comonomer type and concentration, hydrogen concentration, impurities, inerts such as isopentane, and/or operation in or close to condensing mode can be used for each component of a separate addition, multi-component polymerization system for polymerization fraction split control. In response to changes in variables, the feed rates of component catalysts can be adjusted. For example, a change in residence time can be compensated for by forward control that automatically adjusts the catalysts feed rates to a new aim value. Effects of temperature, partial pressure and other variables can also be compensated in a feed forward fashion.

The models can also be used for process control based upon measured polymer split fractions. Ethylene partial pressure, for example could be adjusted by the models based upon the measured split. The concentration of an inert that affects the productivity of one catalyst more than the other could also be adjusted (like isopentane due presumably to its tempered cooling effect).

Most commonly, the catalyst feed rates would be adjusted to move the measured polymer split back to aim. The effects of catalyst decay and residence time are part of the model, so the even the use of catalysts with significant or different decay rates can be controlled.

The instant invention is applicable to gas phase polymerization with solution or liquid feed.

In general the combined catalysts and the activator are combined in ratios of about 1000:1 to about 0.5:1. In a preferred embodiment the catalysts and the activator are combined in a ratio of about 300:1 to about 1:1, preferably about 150:1 to about 1:1, for boranes, borates, aluminates, etc. the ratio is preferably about 1:1 to about 10:1 and for alkyl aluminum compounds (such as diethylaluminum chloride combined with water) the ratio is preferably about 0.5:1 to about 10:1.

Polymerization Process

The catalysts, activators and catalyst systems described above are suitable for use in any polymerization process, including solution, gas or slurry processes or a combination thereof, most preferably a gas or slurry phase process.

In one embodiment, this invention is directed toward the polymerization or copolymerization reactions involving the polymerization of one or more monomers having from 2 to 30 carbon atoms, preferably 2–12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, 3-methyl-pentene-1, 3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms. In an alternate embodiment, the geminally disubstituted olefins disclosed in WO 98/37109 may be polymerized or copolymerized using the invention herein described.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/ norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 75° C. to 110° C., and most preferably in the range of from about 85° C. to about 110° C. Altering the polymerization temperature can also be used as a tool to alter the final polymer product properties.

The productivity of the catalyst(s) or catalyst system(s) is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process. In one embodiment the ethylene partial pressure is about 220 to 240 psi (1517–1653 kPa). In another embodiment the molar ratio of hexene to ethylene ins the reactor is 0.03:1 to 0.08:1.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29, 000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst(s) and/or activator(s) as a solution, as a suspension, as an emulsion, or as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or all of the catalysts are combined with up to 10 weight % of a metal stearate, (preferably a aluminum stearate, more preferably aluminum distearate) based upon the weight of the catalyst system (or its components), any support and the stearate. In an alternate embodiment a solution of the metal stearate is fed into the reactor. In another embodiment the metal stearate is mixed with the catalyst and fed into the reactor separately. These agents may be mixed with the catalyst or may be fed into the reactor in a solution or a slurry with or without the catalyst system or its components.

In another preferred embodiment the supported catalysts combined with the activators are tumbled with 1 weight % of aluminum distearate or 2 weight % of an antistat, such as a methoxylated amine, such as Witco's Kemamine AS-990 from ICI Specialties in Bloomington Del. In another embodiment, a supported catalyst system of component is combined with 2 to 3 weight % of a metal stearate, based upon the weight of the catalyst system (or its components), any support and the stearate.

More information on using aluminum stearate type additives may be found in U.S. Pat. Ser. No. 09/113,261 filed Jul. 10, 1998, which is incorporated by reference herein.

In a preferred embodiment a slurry of the stearate in mineral oil is introduced into the reactor separately from the metal compounds and or the activators.

Experience with solution catalyst has shown that a smooth MMAO flow rate is better for maintaining a low static level in the reactor. Also, quick changes in MMAO flow, either up or down, are preferably avoided or else extreme static levels could be generated.

Reduced static levels will result in reduced agglomeration and sheeting episodes.

While solution or slurry is a referenced embodiment, the catalyst and/or the activator may be placed on, deposited on, contacted with, incorporated within, adsorbed, or absorbed in a support. Typically the support can be of any of the solid, porous supports, including microporous supports. Typical support materials include talc; inorganic oxides such as silica, magnesium chloride, alumina, silica-alumina; polymeric supports such as polyethylene, polypropylene, polystyrene, cross-linked polystyrene; and the like. Preferably the support is used in finely divided form. Prior to use the support is preferably partially or completely dehydrated. The dehydration may be done physically by calcining or by chemically converting all or part of the active hydroxyls. For more information on how to support catalysts please see U.S. Pat. No. 4,808,561 which discloses how to support a metallocene catalyst system. The techniques used therein are generally applicable for this invention.

In another embodiment NMR (or other) equipment is used to analyze the feed stream composition of the catalyst solution prior to injecting it into a polymerization reactor. The information is then used to control individual feed streams and thus the final polymer product.

In another embodiment a selective poison is added to the polymerization which selectively deactivates one of the catalysts in a controlled manner and thereby controls the active split of polymer being produced. Preferred selective poisons include carbon dioxide, carbon monoxide, various internal olefins and dienes, oxygen, Lewis bases such as ethers, esters, and various amines.

In another embodiment if catalyst from one feeder is lost or interrupted during the independent (but mixed) addition of two or more catalyst to a polymerization, the other catalyst feeder(s) are stopped within about 30 minutes, preferably within about 5 minutes, most preferably within about 2 minutes or immediately. The reactor may be killed or mini-killed if residence effects are expected to drive the split off specification when the reactor is operating with no fresh catalyst feed and catalyst feed cannot be restored within a specific period of time dependent upon the performance of the catalysts.

Invention should be applicable to gas phase polymerization with solution feed or hybrid solution feed system.

In a preferred embodiment, the polymer produced herein has an $I_{21}$ (as measured by ASTM 1238, condition E, at 190° C.) of 20 g/10 min or less, preferably 15 g/10 min or less, preferably 12 or less, more preferably between 5 and 10 g/10 min, more preferably between 6 and 8 g/10 min and a melt flow index "MIR" of $I_{21}/I_2$ (as measured by ASTM 1238, condition E and F, at 190° C.) of 80 or more, preferably 90 or more, preferably 100 or more, preferably 125 or more.

In another embodiment, the polymer has an $I_{21}$ (as measured by ASTM 1238, condition E, at 190° C.) of 20 g/10 min or less, preferably 15 g/10 min or less, preferably 12 or less, more preferably between 5 and 10 g/10 min, more preferably between 6 and 8 g/10 min and a melt flow index "MIR" of $I_{21}/I_2$ (as measured by ASTM 1238, condition E, at 190° C.) of 80 or more, preferably 90 or more, preferably 100 or more, preferably 125 or more and has one or more of the following properties in addition:

(a) Mw/Mn of between 15 and 80, preferably between 20 and 60, preferably between 20 and 40;

(b) an Mw of 180,000 or more, preferably 200,000 or more, preferably 250,000 or more, preferably 300,000 or more;

(c) a density (as measured by ASTM 2839) of 0.94 to 0.970 g/cm$^3$; preferably 0.945 to 0.965 g/cm$^3$; preferably 0.950 to 0.960 g/cm$^3$;

(e) a residual metal content of 2.0 ppm transition metal or less, preferably 1.8 ppm transition metal or less, preferably 1.6 ppm transition metal or less, preferably 1.5 ppm transition metal or less, preferably 2.0 ppm or less of group 4 metal, preferably 1.8 ppm or less of group 4 metal, preferably 1.6 ppm or less of group 4 metal, preferably 1.5 ppm or less of group 4 metal, preferably 2.0 ppm or less zirconium, preferably 1.8 ppm or less zirconium, preferably 1.6 ppm or less zirconium, preferably 1.5 ppm or less zirconium(as measured by Inductively Coupled Plasma Optical Emission Spectroscopy run against commercially available standards, where the sample is heated so as to fully decompose all organics and the solvent comprises nitric acid and, if any support is present, another acid to dissolve any support (such as hydrofluoric acid to dissolve silica supports) is present;

(f) 35 weight percent or more high weight average molecular weight component, as measured by size-exclusion chromatography, preferably 40% or more. In a particularly preferred embodiment the higher molecular weight fraction is present at between 35 and 70 weight %, more preferably between 40 and 60 weight %.

Molecular weight (Mw and Mn) are measured as described below in the examples section.

In another embodiment, the polymer product has a residual metal content of 2.0 ppm transition metal or less, preferably 1.8 ppm transition metal or less, preferably 1.6 ppm transition metal or less, preferably 1.5 ppm transition metal or less, preferably 2.0 ppm or less of group 4 metal, preferably 1.8 ppm or less of group 4 metal, preferably 1.6 ppm or less of group 4 metal, preferably 1.5 ppm or less of group 4 metal, preferably 2.0 ppm or less zirconium, preferably 1.8 ppm or less zirconium, preferably 1.6 ppm or less zirconium, preferably 1.5 ppm or less zirconium(as measured by Inductively Coupled Plasma Optical Emission Spectroscopy run against commercially available standards, where the sample is heated so as to fully decompose all organics and the solvent comprises nitric acid and, if any support is present, another acid to dissolve any support (such as hydrofluoric acid to dissolve silica supports) is present.

In another embodiment, the polymer product has a residual nitrogen content of 2.0 ppm or less, preferably 1.8 ppm nitrogen or less, preferably 1.6 ppm nitrogen or less, preferably 1.5 ppm nitrogen or less (as measured by Inductively Coupled Plasma Optical Emission Spectroscopy run against commercially available standards, where the sample is heated so as to fully decompose all organics and the solvent comprises nitric acid and, if any support is present, another acid to dissolve any support (such as hydrofluoric acid to dissolve silica supports) is present.

In another embodiment, the polymer produced herein has a composition distribution breadth index (CDBI) of 70 or more, preferably 75 or more even more preferably 80 or more. Composition distribution breadth index is a means of measuring the distribution of comonomer between polymer chains in a given sample. CDBI is measured according to the procedure in WO 93/03093, published Feb. 18, 1993, provided that fractions having a molecular weight below 10,000 Mn are ignored for the calculation.

In a preferred embodiment, the polyolefin recovered typically has a melt index as measured by ASTM D-1238, Condition E, at 190° C. of 3000 g/10 min or less. In a preferred embodiment the polyolefin is ethylene homopolymer or copolymer. In a preferred embodiment for certain applications, such as films, molded article and the like a melt index of 100 g/10 min or less is preferred. For some films and molded article a melt index of 10 g/10 min or less is preferred.

In another aspect, this invention relates to a polymer produced in a single reactor having an $I_{21}$ of less than or equal to 20 g/10 min and an melt index ratio (MIR=$I_{21}/I_2$) of greater than or equal to 80. $I_{21}$, and $I_2$ are measured according to ASTM 1238, condition E at 190° C.

In another aspect, this invention relates to films produced from the polymer produced herein.

In a preferred embodiment, the catalyst system described above is used to make a polyethylene having a density of between 0.94 and 0.970 g/cm$^3$ (as measured by ASTM 1505) and a melt index of 0.5 or less g/10 min or less (as measured by ASTM D-1238, Condition E, at 190° C.).

Polyethylene having a melt index of between 0.01 to 10 dg/min is preferably produced.

Polyolefins, particularly polyethylenes, having a density of 0.89 to 0.97 g/cm$^3$ can be produced using this invention. In particular polyethylenes having a density of 0.910 to 0.965, preferably 0.915 to 0.960, preferably 0.920 to 0.955 can be produced. In some embodiments, a density of 0.915 to 0.940 g/cm$^3$ would be preferred, in other embodiments densities of 0.930 to 0.970 g/cm$^3$ are preferred.

The melt index (and other properties) of the polymer produced may be changed by manipulating the polymerization system by:

1) changing the amount of the first catalyst in the polymerization system, and/or
2) changing the amount of the second catalyst in the polymerization system, and/or
3) adding or removing hydrogen to or from the polymerization process; and/or
4) changing the amount of liquid and/or gas that is withdrawn and/or purged from the process; and/or
5) changing the amount and/or composition of a recovered liquid and/or recovered gas returned to the polymerization process, said recovered liquid or recovered gas being recovered from polymer discharged from the polymerization process; and/or
6) using a hydrogenation catalyst in the polymerization process; and/or
7) changing the polymerization temperature; and/or
8) changing the ethylene partial pressure in the polymerization process; and/or
9) changing the ethylene to comonomer ratio in the polymerization process; and/or
10) changing the activator to transition metal ratio in the activation sequence, and/or
11) changing the length of time that activator contacts the transition metal in the activation sequence, and/or
12) varying the amount of the activator(s) and/or the two or more catalysts that are introduced into the feed apparatus, and/or
13) altering the point at which the multiple catalysts and or activators are added to the feed apparatus, and/or
14) altering the residence times of the multiple catalysts in the feed apparatus, and/or
15) altering the flow rate of the carrier, and/or
16) altering the temperature of the mixture in the feed apparatus.

In a preferred embodiment the hydrogen concentration in the reactor is about 200–2000 ppm, preferably 250–1900 ppm, preferably 300–1800 ppm, preferably 350–1700 ppm, preferably 400–1600 ppm, preferably 500–1500 ppm, preferably 500–1400 ppm, preferably 500–1200 ppm, preferably 600–1200 ppm, preferably 700–1100 ppm, more preferably 800–1000 ppm.

The polyolefins then can be made into films, molded articles (including pipes), sheets, wire and cable coating and the like. The films may be formed by any of the conventional techniques known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

EXAMPLES

Mn and Mw were measured by gel permeation chromatography on a waters 150° C. GPC instrument equipped with differential refraction index detectors. The GPC columns were calibrated by running a series of molecular weight standards and the molecular weights were calculated using Mark Houwink coefficients for the polymer in question.

$$MWD = M_w/M_n$$

Density was measured according to ASTM D 1505.

Melt Index (MI) $I_2$ was measured according to ASTM D-1238, Condition E, at 190° C.

$I_{21}$ was measured according to ASTM D-1238, Condition F, at 190° C.

Melt Index Ratio (MIR) is the ratio of $I_{21}$ over $I_2$.

Weight % comonomer was measured by proton NMR.

"PPH" is pounds per hour. "mPPH" is millipounds per hour. "ppmw" is parts per million by weight.

CATALYST 1

Indenyl zirconium tris pivalate, a bulky ligand metallocene-type compound, also represented by formula VI, can be prepared by performing the following general reactions:

$Zr(NEt_2)_4 + IndH \rightarrow IndZr(NEt_2)_3 + Et_2NH$ (1)

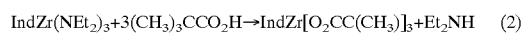
$IndZr(NEt_2)_3 + 3(CH_3)_3CCO_2H \rightarrow IndZr[O_2CC(CH_3)_3]_3 + Et_2NH$ (2)

Where Ind=indenyl and Et is ethyl.

CATALYST 2

Preparation of $[(2,4,6-Me_3C_6H_2)NHCH_2CH_2]_2NH$ Ligand (Ligand I)

A 2 L one-armed Schlenk flask was charged with a magnetic stir bar, diethylenetriamine (23.450 g, 0.227 mol), 2-bromomesitylene (90.51 g, 0.455 mol), tris(dibenzylideneacetone)dipalladium (1.041 g, 1.14 mmol), racemic-2,2'-bis(diphenylphosphino)-1,1'-binaphthyl (racemic BINAP) (2.123 g, 3.41 mmol), sodium tert-butoxide (65.535 g, 0.682 mol), and toluene (800 mL) under dry, oxygen-free nitrogen. The reaction mixture was stirred and heated to 100 C. After 18 h the reaction was complete, as judged by proton NMR spectroscopy. All remaining manipulations can be performed in air. All solvent was removed under vacuum and the residues dissolved in diethyl ether (1 L). The ether was washed with water (3×250 mL) followed by saturated aqueous NaCl (180 g in 500 mL) and dried over magnesium sulfate (30 g). Removal of the ether in vacuo yielded a red oil which was dried at 70 C for 12 h under vacuum (yield: 71.10 g, 92%). $^1$H NMR ($C_6D_6$) δ 6.83 (s, 4), 3.39 (br s, 2), 2.86 (t, 4), 2.49 (t, 4), 2.27 (s, 12), 2.21 (s, 6), 0.68 (br s, 1).

Preparation of Catalyst 2

Preparation of 1.5 wt % Catalyst A in Toluene Solution

Note: All procedures below were performed in a glove box.

1. Weighed out 100 grams of purified toluene into a 1 Erlenmeyer flask equipped with a Teflon coated stir bar.
2. Added 7.28 grams of Tetrabenzyl Zirconium.
3. Placed solution on agitator and stirred for 5 minutes. All of the solids went into solution.

4. Added 5.42 grams of Ligand I.
5. Added an additional 551 grams of purified toluene and allowed mixture to stir for 15 minutes. No solids remained in the solution.
6. Poured catalyst solution into a clean, purged 1-L Whitey sample cylinder, labeled, removed from glovebox and placed in holding area for operations.

Alternate Preparation of Compound I $\{[(2,4,6-Me_3C_6H_2)NCH_2CH_2]_2NH\}Zr(CH_2Ph)_2$ A 500 mL round bottom flask was charged with a magnetic stir bar, tetrabenzyl zirconium (Boulder Scientific) (41.729 g, 91.56 mmol), and 300 mL of toluene under dry, oxygen-free nitrogen. Solid ligand I above (32.773 g, 96.52 mmol) was added with stirring over 1 minute (the desired compound precipitates). The volume of the slurry was reduced to 100 mL and 300 mL of pentane added with stirring. The solid yellow-orange product was collected by filtration and dried under vacuum (44.811 g, 80% yield). $^1$H NMR ($C_6D_6$) δ 7.22–6.81 (m, 12), 5.90 (d, 2), 3.38 (m, 2), 3.11 (m, 2), 3.01 (m, 1), 2.49 (m, 4), 2.43 (s, 6), 2.41 (s, 6), 2.18 (s, 6), 1.89 (s, 2), 0.96 (s, 2).

Preparation of Catalyst 1
Preparation 1 wt % Catalyst 1 in Hexane Solution
All procedures were performed in a glove box.
1. Transfer 1 liter of purified hexane into a 1 L Erlenmeyer flask equipped with a Teflon coated stir bar.
2. Add 6.67 grams of indenyl zirconium tris pivalate dried powder.
3. Place solution on magnetic agitator and stir for 15 minutes. All of the solids go into solution.
4. Pour solution into a clean, purged 1-L Whitey sample cylinder, labeled, and removed from glovebox and place in holding area until use in operation.

CATALYST 3

Catalyst 3 is [1-(2-Pyridyl)N-1-Methylethyl][1-N-2,6-Diisopropylphenyl Amido] Zirconium Tribenzyl and was produced as follows:
Preparation Of [1-(2-Pyridyl)N-1-Methylethyl][1-N-2,6-Diisopropylphenyl]Amine

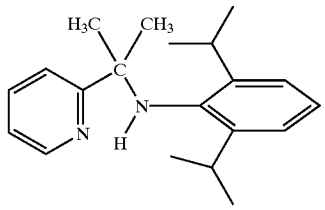

In a dry box, 22.45 mmol (6.34 g) 2-acetylpyridine(2,6-diisopropylphenylimine) were charged to a 250 mL round bottom flask equipped with a stir bar and septa. The flask was sealed, removed from the dry box and placed under nitrogen purge. Dry toluene (50 mL) was added and stirred to dissolve the ligand. The vessel was chilled to 0° C. in a wet ice bath. Trimethyl aluminum (Aldrich, 2.0 M in toluene) was added dropwise over ten minutes. The temperature of the reaction was not allowed to exceed 10° C. When addition of the trimethyl aluminum was complete, the mixture was allowed to warm slowly to room temperature, and then was then placed in an oil bath and heated to 40° C. for 25 minutes. The vessel was removed from the oil bath and placed in an ice bath. A dropping funnel containing 100 mL of 5% KOH was attached to the flask. The caustic was charged to the reaction dropwise over a 1 hour span. The mixture was transferred to a separatory funnel. The aqueous layer was removed. The solvent layer was washed with 100 mL water then 100 mL brine. The red-brown liquid product was dried over $Na_2SO_4$, vacuum stripped and placed under high vacuum over night.

80 mL of red-brown liquid was transferred to a 200 mL Schlenk flask equipped with a stir bar. A distillation head with a dry ice condenser was attached to the flask. The mixture was vacuum distilled yielding approximately 70 g of dark yellow viscous liquid product.

Preparation Of [1-(2-Pyridyl)N-1-Methylethyl][1-N-2,6-Diisopropylphenyl Amido] Zirconium Tribenzyl

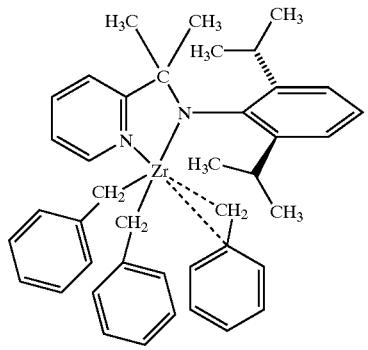

In a darkened room and darkened dry box, 5.0 mmol (1.45 g) of the ligand made in Example 1 were charged to a 100 mL Schlenk tube equipped with a stir bar. The ligand was dissolved in 5 mL of toluene. To a second vessel equipped with a stir bar was charged 5.5 mmol (2.5g) tetrabenzyl zirconium and 10 mL toluene.

The ligand solution was transferred into the tetrabenzyl zirconium solution. The vessel was covered with foil and allowed to stir at room temperature in the dry box. After 6 hours at room temperature 80 mL dry hexane was added to the reaction solution and allowed to stir overnight. The reaction mixture was filtered through a medium porosity frit with approximately 2 g pale yellow solids collected.

CATALYST 4

Catalyst 4 is tetrahydroindenyl zirconium tris pivalate, a bulky ligand metallocene-type compound, also represented by formula VI, can be prepared by performing the following general reactions:

$Zr(NEt_2)_4 + IndH \rightarrow IndZr(NEt_2)_3 + Et_2NH$ (1)

$IndZr(NEt_2)_3 + 3(CH_3)_3CCO_2H \rightarrow IndZr[O_2CC(CH_3)_3]_3 + Et_2NH$ (2)

Where Ind=tetrahydroindenyl and Et is ethyl.

Example 1

An ethylene hexene copolymer was produced in a 14-inch (35.6 cm) pilot plant scale gas phase reactor operating at 85° C., and 350 psig (2.4 MPa) total reactor pressure having a water cooled heat exchanger. The reactor was equipped with a plenum having about 1,600 PPH of recycle gas flow. (The plenum is a device used to create a particle lean zone in a fluidized bed gas-phase reactor. See U.S. Pat. No. 5,693,727.) A tapered catalyst injection nozzle having a 0.041 inch (0.10 cm) hole size was position in the plenum gas flow. Prior to starting the catalyst feed, ethylene pressure was about 220 psia (1.5 MPa), 1-hexene concentration was about 0.6 mol % and hydrogen concentration was about 0.25 mol %. Nitrogen was fed to the reactor as a make-up gas at about 5–8 PPH. The catalyst solution was a 1:1 molar ratio of Catalyst 3:Catalyst 4 catalyst in a toluene solution. Catalyst feed was started at 13 cc's per hour, which was sufficient to give the desired production rate of 17 lbs/hr(kg/hr7.7). The catalyst and co-catalyst (MMAO-3A, 1 wt % Aluminum) were mixed in line prior to passing through the injection nozzle into the fluidized bed. MMAO to catalyst was controlled so that the Al:Zr molar ratio was 300:1. 5.0 lbs/hr (2.3 kg/hr) Nitrogen and 20 lbs/hr (9.1 kg/hr) 1-hexene were also fed to the injection nozzle. A bimodal polymer having nominal 0.43 dg/min ($I_{21}$) and 0.942 g/cc properties was obtained. The resin average particle size was 0.023 inches (0.58 cm). A residual zirconium of 2.2 ppmw was measured by x-ray fluorescence.

Example 2

An ethylene hexene copolymer was produced in a 14-inch pilot plant scale gas phase reactor operating at 85° C. and 350 psig (2.4 MPa) total reactor pressure having a water cooled heat exchanger The reactor was equipped with a plenum having about 1,600 PPH of recycle gas flow. (The plenum is a device used to create a particle lean zone in a fluidized bed gas-phase reactor. See U.S. Pat. No. 5,693,727.) A tapered catalyst injection nozzle having a 0.055 inch (1.4 cm) hole size was position in the plenum gas flow. Prior to starting the catalyst feed, ethylene pressure was about 220 psia (1.5 MPa), 1-hexene concentration was about 0.3 mol % and hydrogen concentration was about 0.12 mol %.

Catalyst 2 was dissolved in a 0.5 wt % solution in toluene and was fed to reactor at 12 cc/hr. MMAO-3A, 1 wt % Aluminum) co-catalyst was mixed with the Catalyst 2 in the feed line prior to the reactor at a molar ratio of 400:1 Al/Zr. The production rate was about 24 lb/hr(10.9kg/hr). In addition, 5.0 lbs/hr (2.3 kg/hr) Nitrogen and 0.1 lbs/hr(0.05 kg/hr) 1-hexene and 0.2 lb/hr (0.09 kg/hr) isopentane were also fed to the injection nozzle. The polymer had a flow index of 0.31 and a density of 0.935 g/cc. After this was established, the catalyst feed rate was reduced to 6 cc/hr of catalyst 2 and a 0.125 wt% Catalyst 1 in hexane solution feed was added to the injection line at 13 cc/hr. The entire order of addition was the hexene and the MMAO mixed with the Catalyst 1, Catalsyt 2 solution was added, then isopentane and nitrogen. The Al/Zr for the entire system was about 500. Within 6 hours of the addition of Catalyst 1, the bimodal polymer had a nominal 12.9 dg/min ($I_{21}$), a 130 MFR(melt flow ratio $I_{21}/I_2$)and 0.953 g/cc density. The resin average particle size was 0.0479 inched (0.12 cm). A residual zirconium of 0.7 ppmw was measured by x-ray fluorescence.

Example 3
—Three Catalyst Component Examples:
Example A. Preparation of a Two-catalyst Component Solution
1. In a glovebox, weighed out 688.4 g of purified toluene into a 1 L Erlenmeyer flask equipped with a Teflon coated stirbar.
2. Added 3.45 g of Catalyst 3 catalyst and 0.43 g of bis n-butylcyclopentadienyl zirconium dichloride, placed on agitator and stirred for 15 minutes. All solids went into solution.
3. Charged 1 L of catalyst solution to a Whitey sample cylinder,.labeled, removed from glovebox and placed into holding area for operations.
Example B. Preparation of Third Catalyst Component Solution
1. In a glovebox, weighed out 647 g of purified hexane into a 1 L Erlenmeyer flask equipped with a Teflon coated stirbar.
2. Added 0.81 g of indenyl zirconium tris-pivalate catalyst from Boulder Scientific, placed on agitator and stirred for 15 minutes. All solids went into solution.
3. Charged 1 L of catalyst solution to a Whitey sample cylinder, labeled, removed from glovebox and placed into holding area for operations.
Example C. Production of Resin Containing Three Catalyst Components UCUT-1507-58 Drums 92–94

An ethylene hexene copolymer was produced in a 14-inch (35.6 cm) pilot plant scale gas phase reactor operating at 85° C. and 350 psig (2.4 MPa) total reactor pressure having a water cooled heat exchanger. Ethylene was fed to the reactor at a rate of about 38 pounds per hour (17.2 kg/hr), hexene was fed to the reactor at a rate of about 0.3 pounds per hour (0.14 kg/hr) and hydrogen was fed to the reactor at a rate of 8 mPPH. Nitrogen was fed to the reactor as a make-up gas at about 4–8 PPH. The production rate was about 30 PPH. The reactor was equipped with a plenum having about 1,600 PPH of recycle gas flow. (The plenum is a device used to create a particle lean zone in a fluidized bed gas-phase reactor. See U.S. Pat. No. 5,693,727.) A tapered catalyst injection nozzle having a 0.055 inch (0.14 cm) hole size was position in the plenum gas flow. Catalyst from Example B was contacted in-line with 1-hexene and 3.55% Al (MMAO-3A) in hexane for approximately 30 minutes before joining a stream of the mixed catalyst from Example A. The catalyst ratio was kept at 2.2:1 (Example B: Example A). The MMAO-3A was controlled so that the overall Al:Zr molar ratio was 230:1. Nitrogen was also fed to the injection nozzle as needed to maintain a stable average particle size.

A broad molecular weight distribution polymer having nominal 4.69 dg/min $I_{21}$, 0.02 dg/min, 234 $I_5/I_{21}$ ratio and 0.948 g/cc properties was obtained. A residual zirconium of 1.18 ppmw was calculated based on a reactor mass balance. The polymer was characterized by SEC (See FIG. 1) and determined to be approximately 53% high molecular weight polymer. The final polymer had an Mn of 12,222, an Mw of 372,661 and an Mw/Mn of 30.49.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. A method to polymerize olefins in a gas-phase reactor comprising introducing a first catalyst, a second catalyst, and at least one activator into the reactor in a liquid carrier, wherein the first catalyst is structurally different from the second catalyst, wherein each catalyst is activated independently without having to compete for the at least one activator, and wherein the first catalyst, the second catalyst and the activator(s) are combined in the liquid carrier before being introduced into the reactor.

2. The method of claim 1 wherein the catalysts are activated sequentially.

3. The method of claim 1 wherein the catalysts are combined in a liquid carrier then introduced into a channeling means connecting to the reactor and thereafter the activator(s) is introduced into the channeling means at the same or different point as the catalysts.

4. The method of claim 1 wherein the catalysts are combined in a liquid carrier and thereafter the activator(s) is introduced into the liquid carrier.

5. The method of claim 4 wherein the liquid carrier containing the catalysts and the activator(s) is placed into an apparatus for introducing the liquid carrier into the reactor.

6. The method of claim 5 wherein the catalysts and liquid carrier are introduced into the apparatus before the activator is introduced into the apparatus.

7. The method of claim 6 wherein the liquid carrier is introduced into the reactor as a stream or spray.

8. The method of claim 1 wherein at least one catalyst, at least one activator and the liquid carrier are placed into an apparatus for introduction into the reactor wherein additional catalyst(s) is/are introduced into the apparatus after the first catalyst and activator are introduced into the apparatus.

9. The method of claim wherein
   a first combination comprising at least one catalyst in a liquid carrier is introduced into an apparatus connecting to the reactor, and
   a second composition comprising at least one activator in liquid carrier is introduced into the apparatus connecting to the reactor,
   then, after a period of time, a different catalyst in liquid carrier is introduced into the apparatus connecting to the reactor, and
   then the catalyst-activator combination is introduced into the reactor.

10. The method of claim 1 wherein
    at least one catalyst(a) and at least one activator(a) are combined in a liquid carrier, and
    at least one catalyst(b) and at least one activator(b) are combined in a liquid carrier,
    wherein the catalyst(b) is different from the catalyst(a) and/or the activator (b) is different from the activator (a),
    thereafter both combinations are introduced into an apparatus connecting to the reactor, and,
    thereafter the combinations are introduced into the reactor.

11. The method of claim 10 wherein the liquid carrier containing catalyst(b) and activator(b) is introduced into the apparatus connecting to the reactor after the liquid carrier containing catalyst(a) and activator(a) is introduced into the apparatus connecting to the reactor.

12. The method of claim 1 wherein:
    a first composition comprising at least one catalyst(a), at least one activator(a) and a liquid carrier is placed in an apparatus connected to the reactor, and
    a second composition comprising at least one catalyst(b), at least one activator(b) and a liquid carrier, wherein the catalyst(b) and/or the activator (b) is different from the catalyst(a) and/or the activator(a), is introduced into the apparatus connecting to the reactor after the first composition is placed into the apparatus, and
    thereafter the combined compositions is introduced into the reactor.

13. The method of claim 1 wherein at least one catalyst and the liquid carrier are placed into an apparatus for introduction into the reactor wherein additional catalyst(s) and activator(s) are introduced into the apparatus after the first catalyst is introduced into the apparatus.

14. The method of claim 1 wherein:
    a first composition comprising at least one catalyst(a), at least one activator(a) and a liquid carrier is introduced into an apparatus feeding into a reactor, and
    thereafter a second catalyst in a liquid carrier is added to the apparatus feeding into the reactor, and
    thereafter a second activator in a liquid carrier is added to the apparatus feeding into the reactor, and
    thereafter the total combination is introduced into the reactor.

15. The method of claim 1 wherein a first catalyst is a bulky ligand metallocene type catalyst and a second catalyst is a group 15 containing compound.

* * * * *